Patented Feb. 13, 1940

2,189,816

UNITED STATES PATENT OFFICE 2,189,816

TREATMENT OF HYDROCARBONS

Jacque C. Morrell and Aristid V. Grosse, Chicago, Ill., assignors to Universal Oil Products Company, Chicago, Ill., a corporation of Delaware No Drawing. Application February 29, 1936,
Serial No. 66,450

9 Claims. (Cl. 260—683)

This invention relates to the treatment of paraffin hydrocarbons, particularly those which are normally gaseous, including ethane, propane, and the butanes, although hydrocarbons up to and including octane and higher homologs may be treated.

In a more specific sense, the invention is concerned with a process for converting the low boiling members of the paraffin series of hydrocarbons into their corresponding olefins which contain two atoms of hydrogen less per molecule and, consequently, have one double bond between carbon atoms.

There is a large commercial production of gaseous paraffin hydrocarbons. They occur in very large quantities in natural gas, particularly those gases associated with the production of crude oil and commonly known as casinghead gases, and this supply is further augmented by the gases produced in cracking oils for the production of gasoline, although this latter type of pyrolytically produced gas contains substantial quantities of olefins as well as paraffinic hydrocarbons.

The greater part of the paraffin gas production is used merely for domestic and industrial fuel purposes and not as a source of hydrocarbon derivatives, on account of the unreactive character of its components in comparison with their olefinic counterparts. A large part of the production is wasted to the atmosphere.

In one specific embodiment, the invention comprises the dehydrogenation of gaseous paraffin hydrocarbons, particularly those containing three and four carbon atoms, such as propane and the butanes, at elevated temperatures in the presence of catalysts comprising essentially aluminum oxide supporting minor amounts of lower oxides of vanadium. Lower boiling liquid hydrocarbons may also be treated according to the process although it is to be distinctly understood that such treatment is not the full equivalent of the treatment of gaseous hydrocarbons.

In the present instance, the catalysts which are preferred for selectively dehydrogenating the lower boiling paraffinic hydrocarbons have been evolved as the result of a large amount of investigation with catalysts having a dehydrogenating action upon various types of hydrocarbons such as are encountered in the fractions produced in the distillation and/or pyrolysis of petroleum and other naturally occurring hydrocarbon oil mixtures. The criterion of an acceptable dehydrogenating catalyst is that it shall split off hydrogen without inducing excess scission of the bonds between carbon atoms or carbon separation. In the present invention catalyst mixtures comprising essentially major amounts of aluminum oxide and minor amounts of lower oxides of vanadium, such as for example $V_2O_3$ or $V_2O_4$, and in some cases some VO, are used. Aluminum oxide alone functions to a limited extent as a dehydrogenating catalyst in the above sense, and the tendency to selective splitting off of hydrogen, on the one hand, has been found to be greatly increased, and the tendency to scission of the carbon-to-carbon bond, on the other hand, has been found to be greatly lessened by the use of the vanadium oxides mentioned, so that the dehydrogenation is rendered much more definite and effective, the yield of olefinic hydrocarbons is much greater, and the life of the catalyst composite is extended.

Our investigations have also demonstrated that the catalytic efficiency of alumina is greatly improved by the presence of oxides of vanadium even in minor amounts, usually of the order of less than 10% by weight of the alumina. It is common practice to utilize catalysts comprising 2 to 5% by weight of these vanadium oxides.

The aluminum oxide to be used as a base material for the manufacture of catalysts for the process may be obtained from natural oxide minerals or ores such as bauxite or carbonates such as Dawsonite by proper calcination, or it may be prepared by precipitation of aluminum hydroxide from solutions of aluminum sulphate or different alums, the precipitate of aluminum hydroxide being dehydrated by heat, and usually it is desirable and advantageous to further treat it with air or other gases or by other means, for instance, leaching, et cetera, to activate it prior to use.

Two hydrated oxides of aluminum occur in nature, to-wit: bauxite, having the formula $Al_2O_3.2H_2O$, and diaspore, $Al_2O_3.H_2O$. In both of these oxides iron sesquioxide may partially replace the aluminum. These two minerals or corresponding oxides produced from precipitated and suitably activated aluminum hydroxide are adaptable for the manufacture of the present type of catalysts and in some instances have given the best results of any of the compounds whose use is at present contemplated. The mineral Dawsonite having the formula

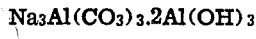

$$Na_3Al(CO_3)_3.2Al(OH)_3$$

is another mineral which may be used as a source of aluminum oxide. It is of course to be understood that these are merely illustrative of sources of the aluminum oxide catalyst base and that other sources and types may also be available.

In making up catalyst composites of the character and composition which according to the present invention have been found specially well suited for catalyzing dehydrogenation reactions, the following is the simplest and generally the preferred procedure. An aluminum oxide mineral or the precipitated hydroxide is calcined at temperatures of from about 600° C. (1112° F.) to 900° C. (1652° F.) to produce a mixture containing a high percentage of aluminum oxide. The oxide is then ground to produce granules of relatively small mesh and these are caused to absorb compounds which will ultimately yield oxides of vanadium on heating to a proper temperature by stirring them with warm and aqueous solutions of soluble vanadium compounds, such as ammonium metavanadate having the formula $NH_4VO_3$, which is sufficiently soluble in warm water to render it readily utilizable. Vanadyl nitrate may also be employed, a solution of this salt being prepared by adding either silver or barium nitrate to solutions of vanadyl chloride or vanadyl sulfates. The carbonate of vanadium ordinarily will not be employed as a source of the oxides. As a further alternative for making up the present types of catalysts, either vanadium pentoxide or the lower oxides may be mixed mechanically with the alumina or, if desired, first made into a paste to insure thorough contacting and mixing and the paste then dried, ground and sized.

The aluminum oxide resulting from calcination at the temperatures mentioned has a high absorptive capacity for solutions and takes up rather large quantities of aqueous solutions without leaving any excess. Some of the salts of vanadium which are utilizable as a source of the primary pentoxide are, however, not extremely soluble in water and in order to get a sufficient quantity of the desired oxides deposited upon the alumina it may be necessary at times to add the aqueous solutions in successive portions with intermediate drying stages rather than to add the alumina to a dilute aqueous solution and depend upon the absorptive capacity for the extraction of the salt.

The oxides resulting from the decomposition of many of the soluble vanadium compounds are principally those in which vanadium exhibits the higher valences, such as in vanadium pentoxide $V_2O_5$. These oxides, however, are reduced by hydrogen, or by the paraffinic gases and the other gases resulting from their decomposition in the first stages of the dehydrogenation reactions so that the essential catalysts for the larger portion of the period of service appear to be the lower oxides.

One of the readily available and utilizable compounds for adding vanadium oxides to alumina is the ammonium vanadate mentioned in the preceding paragraph. This compound is sufficiently soluble in warm water to render it utilizable, and after adding the amount corresponding to the amount of vanadium found most suitable the granules are dried, first at 100° C. for about two hours and then at temperatures of the order of 200–250° C. for some hours longer. If desired the vanadium pentoxide present on the alumina may then be reduced by hydrogen previous to the use of the composite catalyst in dehydrogenation reactions. The alumina particles have a pale yellow color, possibly due to the $V_2O_5$ or some aluminum polyvanadate and the reduction to the oxides is accompanied by the development of a bluish gray color. A very serviceable catalyst is made by dissolving approximately 15.4 parts by weight of the ammonium metavanadate in 200 parts by weight of hot water, and adding the solution in two approximately equal successive portions to 250 parts by weight of activated alumina of 10–12 mesh particle size. The best procedure is usually to dry the alumina particles at 100° C. after the addition of the first half of the vanadate solution and then add the other half of the solution to the air dried material followed by further drying. The percentage of vanadium on the alumina particles is then about 2.75. It should be emphasized that the oxides of vanadium are the essential catalysts in the composite since without them the alumina possesses limited dehydrogenating ability.

In practicing the dehydrogenation of paraffinic gases according to the present process, a solid composite catalyst prepared according to the foregoing briefly outlined methods is used as a filler in a reaction tube or chamber in the form of particles of graded size or small pellets, and the gas to be dehydrogenated is passed through the catalyst after being heated to the proper temperature, usually within the range of from about 400° to 800° C. (752° to 1472° F.). The most commonly used temperatures, however, are around 500° C. to 600° C. (932° to 1112° F.). The catalyst tube is heated exteriorly to maintain the proper reaction temperature. The pressure employed may be subatmospheric, atmospheric or slightly superatmospheric of the order of from 50 to 100 pounds per square inch. While pressures up to 500 pounds per square inch may be employed in some cases, pressures of the order of atmospheric or below are generally preferred. The time during which the gases are exposed to dehydrogenating conditions in the presence of the preferred catalysts is comparatively short, usually below twenty seconds, and preferably as low as from 0.2 to 6 seconds.

It is an important feature of the present process that the gases to be dehydrogenated should be free from all but traces of water vapor since the presence of any substantial amounts of steam reduces the catalytic effectiveness of the composite catalyst to a marked degree. In view of the empirical state of the catalytic art, it is not intended to submit a complete explanation of the reasons for the deleterious influence of water vapor in the present type of catalyzed reactions, but it may be suggested that the action of the steam is to cause a partial hydration of the alumina and the vanadium oxides due to preferential adsorption, so that in effect the paraffin gases are prevented from reaching or being adsorbed by the catalytically active surface.

The exit gases from the catalytic tube or chamber may be passed through selective adsorbents to combine with or absorb the olefin or olefin mixture produced, or the olefins may be selectively polymerized by suitable catalysts, caused to alkylate other hydrocarbons, such as aromatics or paraffins, or treated directly with chemical reagents to produce desirable and commercially valuable derivatives. After the olefins have been removed the residual gases may be recycled for further dehydrogenating treatment with or without removal of hydrogen.

The present types of catalysts are selective in removing two hydrogen atoms from a paraffin molecule to produce the corresponding olefin without furthering to any great degree undesirable side reactions, and because of this show an unusually high conversion of paraffins into olefins as will be shown in later examples. When the activity of these catalysts begins to diminish it is readily regenerated by the simple expedient of oxidizing with air or other oxidizing gas at a moderately elevated temperature, usually within the range employed in the dehydrogenating reactions. This oxidation effectively removes traces of carbon deposits which contaminate the surface of the particles and decrease their efficiency. It is characteristic of the present types of catalysts that they may be repeatedly regenerated without substantial loss of catalytic efficiency.

During oxidation with air or other oxidizing gas mixture in regenerating partly spent material there is evidence to indicate that the vanadium oxides, such as $V_2O_3$ and $V_2O_4$, are to a large extent, if not completely, oxidized to $V_2O_5$, which may combine with the alumina to form a certain amount of various aluminum vanadates. The existence of several aluminum vanadates is known, but analyses have indicated that their composition is rather indefinite so that they may possibly be solid solutions rather than definite chemical compounds. These aluminum vanadates are later decomposed by contact with reducing gases in the first stages of service to reform the lower oxides of vanadium and regenerate the real catalyst and hence the catalytic activity.

Numerous experimental data could be adduced to indicate the results obtainable by employing the present type of catalyst to dehydrogenate paraffins, but the following example is sufficiently characteristic:

A catalyst was prepared by dissolving 15.4 parts by weight of ammonium metavanadate in 200 parts by weight of hot water and adding the solution in two equal successive portions to 250 parts by weight of a 10 to 12 mesh activated alumina. After the addition of the first half of the solution the particles were somewhat damp and were dried at a steam temperature to remove excess water. After this heating the second half of the solution was added and the dehydration repeated. During the heating period ammonia and water were evolved leaving vanadium pentoxide deposited on the alumina particles.

The final steps in the preparation of the catalyst comprised heating at 200–250° C. for several hours, adding the particles to a catalyst chamber in which they were brought up to the necessary reaction temperature for dehydrogenating the paraffinic gas mixture in a current of air, and then subjected to the action of hydrogen at the operating temperature to produce the lower oxides, this change being accompanied by change in color from yellow to bluish gray.

Pure n-butane was then passed through the catalyst bed at a temperature of 500° C. and atmospheric pressure and the following table summarizes the results obtained in two runs wherein different contact times are used:

*Analyses of exit gases*

| Contact time..........seconds.. | 3.5 | 8 |
|---|---|---|
| | Percent | Percent |
| Butylenes | 10.0 | 18.0 |
| Hydrogen | | 18.0 |
| Methane | | 1.2 |
| Ethane | | 0.1 |
| Ethylene | 0.6 | 1.0 |
| n-Butane | | 61.5 |
| | | 99.8 |

It will be seen from the above data that the lower contact time was not sufficient to dehydrogenate to a practical extent. However, at the contact time of 8 seconds the dehydrogenation was adequate, and also distinct and selective, as shown by the fact that the volume of butylenes equaled the volume of hydrogen, within the accuracy of the analytical data.

After a considerable period of time the catalyst became fouled with carbonaceous deposits but could be readily regenerated to its original efficiency by heating in a stream of air at 500° C.

The character of the present invention and its practical applications are sufficiently developed and exemplified by the foregoing specification and limited examples. However, neither section is to be construed as unduly limiting upon its wide and proper scope.

We claim as our invention:

1. A process for the treatment of normally fluid paraffinic hydrocarbons to produce the corresponding olefinic hydrocarbons, which comprises subjecting paraffinic hydrocarbons to the action of a catalyst, comprising essentially a major proportion of aluminum oxide and a minor proportion of a compound of vanadium, at a temperature adequate to dehydrogenate and convert said paraffinic hydrocarbons into olefin hydrocarbons, and recovering the olefin hydrocarbons thus formed.

2. A process for the treating of normally gaseous paraffinic hydrocarbons, which comprises treating said paraffinic hydrocarbons with a catalyst, comprising essentially a major proportion of activated alumina and a minor proportion of an oxide of vanadium, at a temperature adequate to dehydrogenate and convert said paraffinic hydrocarbons into olefin hydrocarbons, and recovering the olefin hydrocarbons thus formed.

3. A process for the treatment of normally fluid paraffinic hydrocarbons to produce the corresponding olefinic hydrocarbons, which comprises subjecting paraffinic hydrocarbons to the action of a catalyst, comprising essentially a major proportion of aluminum oxide and a minor proportion of a lower oxide of vanadium, at a temperature adequate to dehydrogenate and convert said paraffinic hydrocarbons into olefin hydrocarbons, and recovering the olefin hydrocarbons thus formed.

4. A process for the treatment of normally fluid paraffinic hydrocarbons to produce the corresponding olefinic hydrocarbons, which comprise subjecting paraffinic hydrocarbons to the action of a catalyst, comprising essentially a major proportion of aluminum oxide and a minor proportion of a compound of vanadium at a temperature of from 400° to 800° C. to dehydrogenate and convert said paraffinic hydrocarbons into olefin hydrocarbons, and recovering the olefin hydrocarbons thus formed.

5. A process for the treatment of normally fluid paraffinic hydrocarbons to produce the corresponding olefinic hydrocarbons, which comprises subjecting paraffinic hydrocarbons to the action of a catalyst, comprising essentially a major proportion of aluminum oxide and a minor proportion of a compound of vanadium at a temperature of from 500° to 600° C. to dehydrogenate and convert said paraffinic hydrocarbons into olefin hydrocarbons, and recovering the olefin hydrocarbons thus formed.

6. A process for the treatment of normally gaseous paraffinic hydrocarbons to produce the corresponding olefinic hydrocarbons, which comprises treating said paraffinic hydrocarbons with a catalyst, comprising essentially a major proportion of aluminum oxide and minor amounts of lower oxides of vanadium, at a temperature of from 400° to 800° C. to dehydrogenate and convert the paraffin hydrocarbons into olefin hydrocarbons, and recovering the latter.

7. A process for the treatment of normally gaseous paraffinic hydrocarbons to produce the corresponding olefinic hydrocarbons, which comprises treating said normally gaseous paraffinic hydrocarbons with a catalyst, comprising essentially aluminum oxide containing approximately two to five percent of an oxide of vanadium, at a temperature of from 500° to 600° C. to dehydrogenate and convert the paraffin hydrocarbons into olefin hydrocarbons, and recovering the latter.

8. A process for the treatment of normally gaseous paraffinic hydrocarbons to produce the corresponding olefinic hydrocarbons, which comprises treating said normally gaseous paraffinic hydrocarbons with a catalyst, comprising essentially aluminum oxide containing approximately two to five percent of an oxide of vanadium, at a temperature of from 500° to 600° C., and for a time period greater than 0.2 second and less than 10 seconds, to dehydrogenate and convert the paraffin hydrocarbons into olefin hydrocarbons, and recovering the latter.

9. A process for treating paraffinic hydrocarbons which comprises subjecting the same under dehydrogenating conditions to the action of a mixture of a major proportion of aluminum oxide and a minor proportion of a vanadium oxide.

JACQUE C. MORRELL.
ARISTID V. GROSSE.